United States Patent
Je et al.

(10) Patent No.: US 11,911,983 B2
(45) Date of Patent: Feb. 27, 2024

(54) METHOD OF FORMING MICRO- OR NANOWIRES AT PREDETERMINED POSITIONS OF AN OBJECT USING A MICRO- OR NANOPIPETTE

(71) Applicant: POSTECH Research and Business Development Foundation, Pohang-si (KR)

(72) Inventors: Jung Ho Je, Pohang-si (KR); Un Yang, Pohang-si (KR); Seung Soo Oh, Pohang-si (KR); Moon Jung Yong, Incheon (KR); Byung Hwa Kang, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 408 days.

(21) Appl. No.: 17/306,220

(22) Filed: May 3, 2021

(65) Prior Publication Data

US 2022/0250344 A1    Aug. 11, 2022

(30) Foreign Application Priority Data

Feb. 1, 2021    (KR) .................. 10-2021-0014231

(51) Int. Cl.
*B29D 11/00* (2006.01)
*B82Y 40/00* (2011.01)
(Continued)

(52) U.S. Cl.
CPC ........ *B29D 11/00663* (2013.01); *B82Y 40/00* (2013.01); *D01D 5/06* (2013.01); *B29K 2105/0073* (2013.01)

(58) Field of Classification Search
CPC ..................... B29D 11/00663; D01D 5/06
See application file for complete search history.

(56) References Cited

U.S. PATENT DOCUMENTS

| 2016/0049214 A1 | 2/2016 | Reece |
| 2020/0103256 A1 | 4/2020 | Kim et al. |

FOREIGN PATENT DOCUMENTS

| KR | 20110086253 | * | 7/2011 |
| KR | 20130057546 |   | 6/2013 |

(Continued)

OTHER PUBLICATIONS

An, et al., Nanomeniscus-induced delivery of liquid solutions for diverse nanofiber fabrication, Nano Convergence, 2015, vol. 2, No. 13.

(Continued)

*Primary Examiner* — Nathan T Leong
(74) *Attorney, Agent, or Firm* — CANTOR COLBURN LLP

(57) ABSTRACT

Provided is a method of forming a micro/nanowire having a nanometer- to micrometer-sized diameter at predetermined positions of an object. The method includes: preparing a micro/nanopipette having a tip with an inner diameter which is substantially the same as the diameter of the micro/nanowire to be formed; filling the micro/nanopipette with a solution containing a micro/nanowire-forming material; brining the solution into contact with the object through the tip of the micro/nanopipette; and pulling the micro/nanopipette from the object at a pulling speed lower than or equal to a predetermined critical speed ($v_c$) to obtain a micro/nanowire having substantially the same diameter as the inner diameter of the micro/nanopipette tip.

7 Claims, 8 Drawing Sheets

(51) Int. Cl.
*D01D 5/06* (2006.01)
*B29K 105/00* (2006.01)

(56) References Cited

FOREIGN PATENT DOCUMENTS

| KR | 101526324 | 6/2015 |
|---|---|---|
| KR | 101583739 | 1/2016 |
| KR | 20160000281 | 1/2016 |

OTHER PUBLICATIONS

Goehring, et al., Solidification and Ordering during Directional Drying of a Colloidal Dispersion, Langmuir, 2010, vol. 26, No. 12, pp. 9269-9275.

Han, et al., Stimuli-Responsive Self-Immolative Polymer Nanofiber Membranes Formed by Coaxial Electrospinning, ACS Applied Materials & Interfaces, 2017, vol. 9, pp. 11858-11865.

Harfenist, et al., Direct Drawing of Suspended Filamentary Micro- and Nanostructures from Liquid Polymers, Nano Letters, 2004, vol. 4, No. 10, pp. 1931-1937.

Kang, et al., A Robust Highly Aligned DNA Nanowire Array-Enabled Lithography for Graphene Nanoribbon Transistors, Nano letters, 2015, vol. 15, pp. 7913-7920.

Kim, et al., Three-Dimensional Writing of Conducting Polymer Nanowire Arrays by Meniscus-Guided Polymerization, Advanced Materials, 2011, vol. 23, pp. 1968-1970.

Lee, et al., Quantitative Probing of Cu2+ Ions Naturally Present in Single Living Cells, Advanced Materials, 2016, vol. 28, pp. 4071-4076.

Li, et al., Drying Dip-Coated Colloidal Films, Langmuir, 2012, vol. 28, pp. 200-208.

Long, et al., DNA optical nanofibers: preparation and characterization, Optics express, Jul. 2012, vol. 20, No. 16, pp. 18188-18193.

Min, et al., Large-scale organic nanowire lithography and electronics, Nature communications, 2013, pp. 1-9.

Nagarajan, et al., Overview of Protein-Based Biopolymers for Biomedical Application, Macromolecular Chemistry and Physics, 2019, vol. 220, 1900126.

Park, et al., 3D printed structures for delivery of biomolecules and cells: tissue repair and regeneration, Journal of Materials Chemistry B, 2016, vol. 4, pp. 7521-7539.

Shahriar, et al., Electrospinning Nanofibers for Therapeutics Delivery, Nanomaterials, 2019, vol. 9.

Tuniz, et al., Interfacing optical fibers with plasmonic nanoconcentrators, Nanophotonics, 2018, vol. 7, No. 7, pp. 1279-1298.

Yan, et al., Nanowire-based single-cell endoscopy, Nature Nanotechnology, Mar. 2012, vol. 7, pp. 191-196.

Yoo, et al., A Stretchable Nanowire UV-Vis-NIR Photodetector with High Performance, Advanced Materials, 2015.

Zhang, et al., Electrospinning design of functional nanostructures for biosensor applications, Journal of Materials Chemistry B, 2017, vol. 5, pp. 1699-1711.

\* cited by examiner

Non-confined growth

Confined growth

Non-confined growth

Confined growth

METHOD OF FORMING MICRO- OR NANOWIRES AT PREDETERMINED POSITIONS OF AN OBJECT USING A MICRO- OR NANOPIPETTE

BACKGROUND

1. Technical Field

The present disclosure relates to a method of forming micro- or nanowires (hereinafter referred to as "micro/nanowires") at predetermined positions of an object using a micro- or nanopipette (hereinafter referred to as "micro/nanopipette"), and more particularly, to a method of forming a micro/nanowire predetermined positions of an object using a micro/nanopipette having a tip with a nanometer- to micrometer-sized diameter.

2. Related Art

Micro- and nanotechnology refers to a technology of fabricating devices or systems exhibiting novel or improved physical/chemical/biological properties by manipulating, analyzing, and controlling materials in the range of several nanometers to several micrometers and subjecting the devices or systems to micro- or nanoprocessing. This technology is applied for producing products with high performance using minimum amounts of raw materials, and is used in various fields to improve the performance of existing products or create new functions. In particular, one-dimensional linear structures of microwires and nanowires have various advantages. First of all, the micro- or nano-structures are advantageous for mass transfer or detection of target materials because they facilitate material exchange through their large surface areas. In addition, the micro- or nano-structures may be used to realize devices with desired geometry by forming specific linear patterns and frameworks or by establishing connection between device elements. Due to these advantages, microwires and nanowires are used in very diverse fields, including optical communication (see Nanophotonics, 7, 1279-1298 (2018), and Optics express, 20, 18188-18193 (2012)), drug delivery (see Nanomaterials, 9, 532. (2019), and ACS applied materials & interfaces, 9, 11858-11865 (2017)), lithography (see Nano letters, 15, 7913-7920 (2015)), optical sensors (see Advanced Materials, 27(10), 1712-1717 (2015)), and biosensors (see Journal of Materials Chemistry B, 5, 1699-1711 (2017)).

In the field of optical communication, various studies for optical connection at nanoscale have been conducted. For example, a method of directly growing polymer nanowires between optical fibers was suggested (see Optics express, 20, 18188-18193 (2012)). However, since the nanowire fabrication of polymer materials is greatly influenced by the concentration of their solution and the given environments, it is difficult to fabricate polymer nanowires having uniform diameters and densities. In polymeric nanowire fabrication by conventional methods, therefore, large light losses at the junction between the optical fiber and the nanowire were inevitable. For this reason, in order to minimize the light loss, a nanowire process technology is required which is precisely controllable while being less affected by the surrounding environment.

For micro- or nanowire materials which are used in biomedical and tissue engineering fields, sufficient physical properties, biocompatibility, and biodegradability need to be taken into consideration (see Journal of Materials Chemistry B, 4, 7521-7539 (2016)). Biopolymers such as nucleic acids and proteins, which are compounds mostly consisting of living organisms, have biocompatibility and biodegradability, and are currently used as core materials in the fields such as biomedical and biological tissue engineering (see Macromolecular Chemistry and Physics, 220, 1900126 (2019)). In addition, since a specific biopolymer material may induce desired in vivo responses or control physicochemical properties by binding functional molecules thereto, it is important to broaden the range of biopolymer materials that may be selected for use in the fabrication of micro/nanowires. However, biopolymers, not only by their various materials types but also by their different physical properties, thermal elasticity, and hygroscopicity thereof, are greatly affected by environmental factors such as temperature and humidity. For this reason, it is furthermore difficult to form one- to three-dimensional structures of biopolymer micro/nanowires due to limited physical properties of biopolymers in their fabrication processes (see Macromolecular Chemistry and Physics, 220, 1900126 (2019)). Therefore, for the fabrication of biopolymer micro- or nanowires, it is becoming important to develop an optimal process method which is less affected by the type of their materials or the external environments.

One technology for fabricating polymer nanowires is an electrospinning-based method which is able to draw out a solution through a nozzle by a potential difference between the nozzle end and a collector (see Nature communications, 4, 1-9 (2013)). In this nanowire printing process, the solution is released very quickly due to the potential difference, which permits to quickly print a desired nanowire pattern over a large area by controlling the movement of the substrate. However, materials that may be used in this method are limited to electrically charged polymers, and it is difficult for this method to position nanowires at desired positions on the substrate and three-dimensionally print nanowires on a flat surface. For these reasons, the application of this method is very limited to the fabrication of various device elements.

Another technology for fabricating polymer nanowires is a probe-based drawing method (see Nano Letters, 4, 1931-1937 (2004)). This method may fabricate nanowires by forming a high-concentration polymer droplet at a probe tip, bringing the polymer droplet into contact with a target, and then stretching the polymer droplet while controlling the position of the probe. However, since the stretching degree of the polymer varies depending on the concentration of the polymer solution and the surrounding environment in the nanowire fabrication process, it is difficult to fabricate 1D or 3D nanowires having uniform characteristics.

As still another technology for fabricating a three-dimensional polymer nanowire, there is a meniscus-guided method (see Journal of Materials Chemistry B, 4, 7521-7539 (2016), and Advanced Materials, 23, 1968-1970 (2011)). This method forms a nanowire by bringing a pipette filled with a polymer solution into contact with a substrate and then pulling the pipette at high speeds. In the process of rapidly pulling the pipette, a meniscus is formed between the tip of the pipette and the nanowire, and at this time, the meniscus solution is stretched depending on the pulling speed of the pipette, thus determining the diameter of the nanowire. Since it is possible for this method to adjust the position, shape, and diameter of the nanowire within the nano-range, this method has high accuracy and is advantageous for fabricating various 3D nanodevices. However, there is a limit to controlling the diameter of the nanowire, because the stretching degree of the meniscus varies depending on the concentration and physical properties of the polymer, temperature, humidity, and the like.

For another example of a method of fabricating a nanowire using a meniscus, reference may be made to Korean Patent No. 10-1583739 (Jan. 4, 2016) (entitled "Nanowire Including Lead Sulfide Quantum Dot-Poly(3-Hexylthiophene), and UV/Vis/Far-IR Detectable Stretchable Nanowire Photodetector and Photodetector Arrays Including the Same") (hereinafter referred to as "Conventional Art 1") (see FIG. 1).

Conventional Art 1 discloses a method of fabricating a nanowire having a nanometer-sized diameter using a micropipette having a tip with a micrometer-sized diameter. This method includes: preparing a mixture solution containing PbS quantum dots and poly(3-hexylthiophene); filling a micropipette with the mixture solution; forming a meniscus of the mixture solution on a substrate using the micropipette; and forming a column-shaped nanowire by pulling the micropipette, while exposing the nanowire mixture solution to air.

Here, since the tip diameter of the micropipette is on the order of micrometers and the nanowire diameter fabricated is on the order of nanometers, it is essential to form a meniscus of the mixture solution at the micropipette tip. Regarding this essential requirement, Conventional Art 1 discloses that the diameter and length of the nanowire may be adjusted by controlling the pulling speed of the micropipette and the distance of the micropipette from the electrode surface, respectively.

However, it is difficult for Conventional Art 1 to obtain a nanowire having a designed diameter, and Conventional Art 1 does not describe how to determine the pulling speed of the micropipette in order to obtain the designed diameter.

For another example of a method of fabricating nanowires using a meniscus, reference may be made to Korean Patent No. 10-1969844 (Apr. 11, 2019) (entitled "Method for Fabricating Nanowire Connected to Optical Fiber) (hereinafter referred to as "Conventional Art 2")

Conventional Art 2 discloses a method of fabricating a nanowire (having a nanometer-sized diameter) at the tip of an optical fiber using a micropipette (a pipette having a tip with a micrometer-sized diameter). In this method, the difference between the tip diameter of the micropipette and the nanowire diameter to be fabricated is large, and hence, as shown in FIG. 2, it is essential to form a meniscus stretched to nanoscale at the micropipette tip. In addition, in order to form a nanowire having a given diameter, it is essential to keep the constant shape and size of the meniscus. Nevertheless, it is also difficult for Conventional Art 2 to obtain a nanowire having a designed diameter, and Conventional Art 2 does not disclose a control method for fabricating the nanowire while keeping the meniscus constant, that is, how to control the pulling speed of the micropipette.

SUMMARY

An object of the present disclosure is to provide an efficient method for fabricating a micro/nanowire, which may facilitate precise and easy control of not only the positions but also the diameters of polymer micro/nanowires fabricated, regardless of not only the types and concentrations of polymer solutions but also external environmental factors.

The present disclosure for achieving the above object discloses a method of forming a micro/nanowire having a nanometer- to micrometer-sized diameter at predetermined positions of an object. The method includes: preparing a micro/nanopipette having a tip with an inner diameter which is substantially the same as the diameter of the micro/nanowire to be formed; filling the micro/nanopipette with a solution containing a micro/nanowire-forming material; brining the solution into contact with the object through the tip of the micro/nanopipette; and pulling the micro/nanopipette apart from the object at a pulling speed lower than or equal to a predetermined critical speed ($v_c$) to obtain a micro/nanowire having substantially the same diameter as the inner diameter of the micro/nanopipette tip. Here, the critical speed ($v_c$) is the maximum limit of the pulling speed at which the micro/nanowire to be formed has the same diameter as the inner diameter of the micro/nanopipette tip, and when the pulling speed is lower than the critical speed, a micro/nanowire having the same diameter as the inner diameter of the micro/nanopipette tip is formed, and when the pulling speed is higher than the critical speed, a micro/nanowire having a diameter different from the inner diameter of the micro/nanopipette tip is formed.

In addition, the critical speed ($v_c$) is inversely proportional to the inner diameter of the micro/nanopipette tip.

In addition, the critical speed ($v_c$) may be determined by the following equation:

$$v_c = \frac{a}{d_{pt}} \left( a = 4xE \frac{\phi_0}{\phi_{wet} - \phi_0} \right)$$

wherein $d_{pt}$ is the inner diameter of the micro/nanopipette tip; x is the axial length of a wet solid region; E is the evaporation rate of the solvent from the solution; $\phi_{wet}$ is the volume fraction of a solute (that is, the micro/nanowire-forming material) in the wet solid region; and $\phi_0$ is the volume fraction of the solute in the solution within the micro/nanopipette.

At this time, the wet solid region shows a state in which the solvent is still evaporating from the surface of the wet solid region, even though the wet solid region retains the shape of the micro/nanowire due to solidification of at least a portion of the solution drawn through the micro/nanopipette tip.

In addition, the method of the present disclosure may further include separating the micro/nanowire from the micro/nanopipette tip by increasing the pulling speed of the micro/nanopipette.

In particular, the object may be a silicon substrate, an optical fiber, or any nanometer- to micrometer-sized device or structure, and the micro/nanowire may be formed at a flat or curved surface of the object or at an edge, corner, vertex or horn-shaped tip of the object.

In the present disclosure, the micro/nanowire-forming material may include at least one of: a hydrophobic polymer selected from the group consisting of polystyrene, poly (lactic acid) (PLA), poly(caprolactone) (PCA), poly(3,4-ethylenedioxythiophene) polystyrene sulfonate (PEDOT: PSS), polystyrene-co-maleic acid, poly(methyl methacrylate), polycarbonate, polyurethane, polyvinylpyrrolidone (PVP), and polyvinylidene fluoride (PVDF); or a hydrophilic polymer selected from the group consisting of poly(acrylic acid) (PAA), polyacrylamide (PAM), polystyrene sulfonate (PSS), poly(vinyl alcohol) (PVA), alginate, and dextran; or an organic conductive polymer (π-conjugated polymer); or a nucleic acid selected from the group consisting of DNA and RNA; or a protein selected from the groups consisting of bovine serum albumin (BSA), gelatin, and collagen; or a polysaccharide selected from the groups consisting of dextran and glycogen.

Furthermore, a solvent for dissolving the micro/nanowire-forming material may be at least one of DI water, dimethyl sulfoxide (DMSO), dimethylformamide (DMF), toluene, xylene, tetrahydrofuran (THF), ethanol, and chloroform; or any material capable of dissolving the micro/nanowire-forming material.

DETAILED DESCRIPTION

Figure 1:
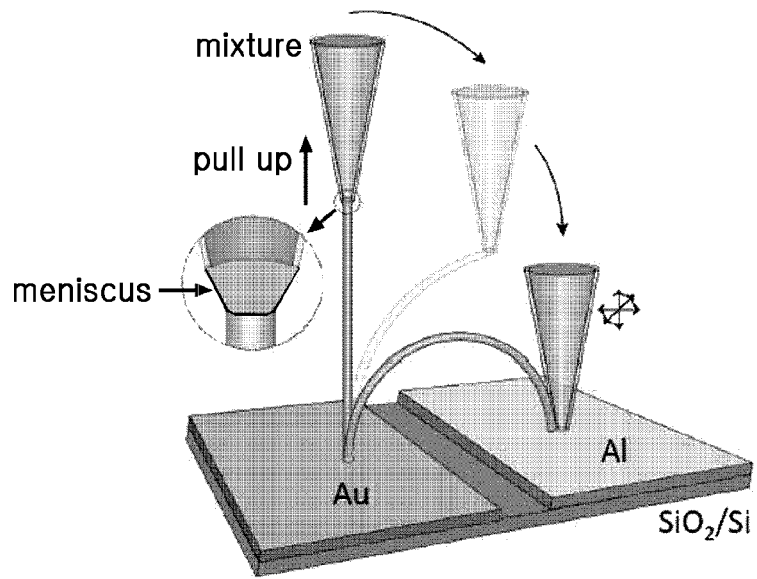
FIG. 1 is a view showing a nanowire formation method according to Conventional Art 1.
Figure 2:
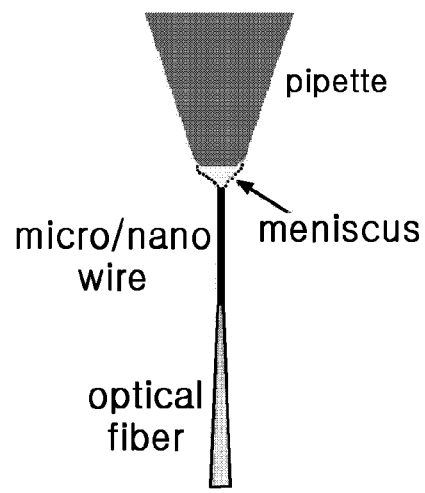
FIG. 2 is a view showing forming a nanowire at the tip of an optical fiber by forming a meniscus at the tip of a micropipette.

Hereinafter, preferred embodiments of a method of forming a micro/nanowire at predetermined positions of an object using a micro/nanopipette according to the present disclosure will be described with reference to the accompanying drawings. For reference, the terms referring to each component in the present disclosure are terms defined in consideration of the functions of the components, and thus it should not be understood that the technical content of the present disclosure is predicted and limited by the terms themselves. In addition, in the present disclosure, singular expressions include plural expressions unless specified otherwise in the context thereof.

The present disclosure discloses a method of forming a micro/nanowire having a nanometer- to micrometer-sized diameter at predetermined positions of an object. The method includes: preparing a micro/nanopipette having a tip with a nanometer- to micrometer-sized diameter, particularly an inner diameter which is substantially the same as the diameter of the micro/nanowire to be formed; filling the micro/nanopipette with a solution containing a micro/nanowire-forming material; brining the solution into contact with the object through the tip of the micro/nanopipette; and pulling one or both of the micro/nanopipette and the object at a speed lower than or equal to a predetermined critical speed to form a micro/nanowire having a diameter which is substantially the same diameter as the inner diameter of the tip of the micro/nanopipette and is uniform during growth. The method further includes separating the formed micro/nanowire from the tip of the micro/nanopipette by increasing the pulling speed of the micro/nanopipette when the micro/nanowire is formed up to a predetermined length.

Here, the critical speed (vc) is the maximum limit of the pulling speed at which the micro/nanowire to be formed has the same diameter as the inner diameter of the tip of the micro/nanopipette, and when the pulling speed is lower than the critical speed, a micro/nanowire having the same diameter as the inner diameter of the tip of the micro/nanopipette is formed, and when the pulling speed is higher than the critical speed, a micro/nanowire having a diameter different from the inner diameter of the tip of the micro/nanopipette, particularly a diameter smaller than the inner diameter of the tip, is formed.

As used herein, the expression "pulling one or both of the micro/nanopipette and the object" includes moving both the micro/nanopipette and the object closer to each other or away from each other; moving the object in a state in which the micro/nanopipette is fixed; or moving the micro/nanopipette in a state in which the object is fixed. In particular, the present disclosure describes that the micro/nanopipette is moved upward in a state in which the object is fixed at the lower side. In particular, the present disclosure describes that the tip of the micro/nanopipette is brought into contact with the object by moving the micro/nanopipette downward in a vertical direction in a state in which the object is fixed at the lower side, and the micro/nanowire extending from the object in the vertical direction is formed by moving the micro/nanopipette upward in the vertical direction.

As used herein, the term "object" may include any/all objects. For example, the term "object" may include a substrate formed of silicon and other materials, an optical fiber, or any nanometer- to micrometer-sized device or structure.

In addition, the micro/nanowire may be formed at any predetermined positions of the object. For example, the micro/nanowire may be formed at any predetermined position such as on a flat or curved surface, an edge, a corner, a vertex, or a horn-shaped tip. In addition, the micro/nanowire may be formed not only in a linear (straight) shape, but also in any three-dimensional curved shape.

1. PRINCIPLE AND PROBLEM OF CONVENTIONAL MENISCUS-GUIDED METHOD

Figure 3A:
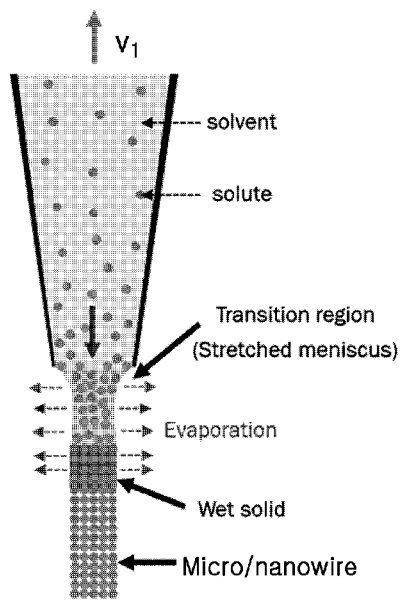
FIGS. 3a and 3b are the views showing the states in which a micro/nanowire is formed under each of a non-confined growth condition and a confined growth condition, respectively.

A micro/nanowire is produced while a solution is drawn and solidified when a micro/nanopipette filled with the solution is pulled upward ($v_1$ in FIG. 3a). Since the solvent evaporates from the surface of the drawn solution and the solute does not evaporate, a wet solid region in which the concentration of the solute in the solution is very high is formed over time. On the other hand, since the solute concentration of the solution in the micro/nanopipette is low, a transition region is formed between the liquid phase of the solution and the wet solid region (see Langmuir, 28, 200-208 (2012)). Here, the wet solid region corresponds to a region in which the solvent flowed from the pipette by capillary flow is still evaporating from the surface of the region, even though the wet solid region retains the shape of the micro/nanowire due to solidification of at least a portion (particularly most) of the solution drawn through the micro/nanopipette tip. At this time, as the micro/nanopipette continues to be moved, the solvent evaporates at high speed, so that a fine line of a completely solid micro/nanowire is formed.

In the process of fabricating the micro/nanowire, the transition region greatly affects the growth behavior of the micro/nanowire. Where the pulling speed ($v_1$) of the micro/nanopipette is sufficiently fast so that the evaporation rate of the solution that is drawn from the micro/nanopipette is lower than the drawing rate, a transition region occurs in which the liquid phase and the solid phase coexist. In this transition region, a meniscus is formed by the surface tension of the solution (FIG. 3a). The meniscus of this transition region is stretched by pulling the micro/nanopipette and determines the diameter of the micro/nanowire.

Then, as the solvent evaporates from the surface of the stretched meniscus, a completely solid micro/nanowire is formed from the wet solid region while the proportion of the solute significantly increases. When the micro/nanopipette is continuously pulled at a constant speed, the diameter of the micro/nanowire reaches the equilibrium value while the shape of the stretched meniscus is maintained. At this time, a problem arises in that the stretching degree of the meniscus varies depending on the type of material or the surrounding environment, and thus the diameter value of the micro/nanowire also changes. In addition, it is inevitable that the diameter of the micro/nanowire decreases gradually until it reaches the equilibrium value.

2. FEATURE OF THE PRESENT DISCLOSURE: CONFINED GROWTH METHOD

Figure 3B:
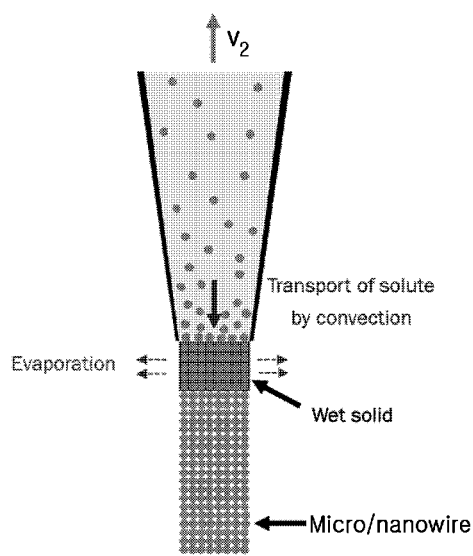

When the pulling speed ($v_2$) of the pipette is sufficiently low so that the evaporation rate of the solution is higher than the flow rate of the solution, the transition region may be negligibly small and no meniscus may be formed (FIG. 3b). That is, the drawn solution immediately turns into a wet solid state without a transition region, and then immediately turns into a completely solid micro/nanowire. In this case, the growth of the micro/nanowire is achieved in a state in which the shape of the wet solid region is confined by the shape of the micro/nanopipette tip. In particular, in this case, the inner diameter of the micro/nanopipette tip becomes the diameter of the micro/nanowire ($d_w \approx d_{pt}$). Thus, it is always possible to grow a micro/nanowire with a desired constant diameter regardless of the type of material or the surrounding environment. Here, since the formation of the wet solid is confined by the inner diameter of the pipette tip, the growth of the micro/nanowire is defined as "confined growth". On the other hand, a method such as the conventional "probe-based drawing" method based on stretching of solution or the conventional "meniscus-guided method" is defined as "non-confined growth" (FIG. 3a).

In summary, when the pulling speed of the pipette is high, non-confined growth occurs. On the other hand, when the pulling speed is low, confined growth is expected to occur. Thereby, it can be considered that there may be a critical speed ($v_c$) that defines a boundary between confined and non-confined growth.

The present disclosure has advantages in that the diameter of the micro/nanowire is easily controlled during the growth thereof under the confined growth condition, and in that the diameter thereof does not change depending on the type of solution material or the surrounding environment, as long as the confined growth condition is satisfied.

3. MATERIALS USABLE IN MICRO/NANOWIRE FABRICATION

In the present disclosure, the solution containing the material consists of a micro/nanowire-forming material and a solvent. Examples of the micro/nanowire-forming materials include most organic materials. In particular, the micro/nanowire-forming material that may be used in the present disclosure may be a hydrophobic polymer selected from the group consisting of polystyrene, poly(lactic acid) (PLA), poly(caprolactone) (PCA), poly(3,4-ethylenedioxythiophene) polystyrene sulfonate (PEDOT:PSS), polystyrene-co-maleic acid, poly(methyl methacrylate), polycarbonate, polyurethane, polyvinylpyrrolidone (PVP), and polyvinylidene fluoride (PVDF); or a hydrophilic polymer selected from the group consisting of poly(acrylic acid) (PAA), polyacrylamide (PAM), polystyrene sulfonate (PSS), poly(vinyl alcohol) (PVA), alginate, and dextran. In addition, as the micro/nanowire-forming material, an organic conductive polymer ($\pi$-conjugated polymer) may be also used, which is characterized in that the electrical and optical properties thereof may be freely controlled through chemical doping. A biopolymer may be also used as the micro/nanowire-forming material. The biopolymer may be a nucleic acid selected from the group consisting of DNA and RNA; or a protein selected from the group consisting of bovine serum albumin (BSA), gelatin, and collagen; or a polysaccharide selected from the group consisting of dextran and glycogen.

Meanwhile, as the solvent, a liquid capable of dissolving the micro/nanowire-forming material may be used, and examples thereof include DI water, dimethyl sulfoxide (DMSO), dimethylformamide (DMF), toluene, xylene, tetrahydrofuran (THF), ethanol, chloroform, and the like.

4. SIMULATION OF CONFINED GROWTH METHOD (1) Calculation of Critical Speed ($v_c$) of Pipette As suggested in the feature of the present disclosure, it is expected that the growth behavior of a micro/nanowire will show confined growth when the pulling speed of the pipette is sufficiently low, and will show non-confined growth when the pulling speed of the pipette is high. Accordingly, it is necessary to calculate the critical speed ($v_c$) of the pipette that determines the growth behavior of the micro/nanowire.

In general, a transition region exists between the liquid phase of the solution and the wet solid region, but it appears that the transition region is very small near the critical speed. When the solvent evaporates from the wet solid surface, the concentration of the solvent vapor at the surface is as follows by Fick's 2nd law:

$$\frac{\partial \phi}{\partial t} - D \nabla^2 c = 0 \qquad (1)$$

wherein c represents the vapor concentration of the solvent, and D is the diffusion coefficient and is affected by the type of solvent, temperature, humidity, and the like.

Here, assuming that the solvent evaporates rapidly from the surface of the wet solid forming the micro/nanowire and that the vapor concentration (c) of the solvent rapidly reaches a steady state in a gas area adjacent to the surface, the following equation is obtained:

$$\nabla^2 c = 0 \quad (2)$$

In fact, on the surface of the wet solid forming the micro/nanowire, the solvent evaporates rapidly because of the large specific surface area of the wet solid. Thus, it is reasonable to assume that the vapor concentration of the solvent rapidly reaches a steady state in the gas area adjacent to the surface.

The concentration of the solvent at the surface of the wet solid is taken as the saturated vapor concentration, and at this time, the evaporation flux (E) is as follows:

$$E = -D\nabla c \quad (3)$$

Here, given the type of solvent, temperature, and humidity, the evaporation flux has a constant value, and the evaporation flux of the solvent per unit time at the surface of the wet solid is as follows:

$$\pi d_{wet} x E \quad (4)$$

wherein $d_{wet}$ represents the diameter of the wet solid region (which may be replaced by the inner diameter of the pipette tip), and x represents the axial length of the wet solid region. When the solvent evaporates from the surface of the wet solid, the solution in the pipette moves in the direction of the micro/nanowire by capillary flow. In the present disclosure, the diameter of the wet solid region, the diameter of the micro/nanowire to be formed, and the inner diameter of the tip of the micro/nanopipette are considered substantially the same as one another. At this time, since the amount of the moved solution is the same as the amount of the evaporated solvent, the following equation is established:

$$\frac{\pi}{4} d_{wet}^2 u = \pi d_{wet} x E \quad (5)$$

wherein u represents the moving speed of the solution that moves from the pipette in the direction of the micro/nanowire by capillary flow. In addition, assuming that the growth rate of the wet solid region is $v_{wet}$, the following relationship is established (see Langmuir, 26, 9269-9275 (2010)):

$$u \approx v_{wet} \frac{\phi_{wet} - \phi_0}{\phi_0} \quad (6)$$

wherein $\varphi_{wet}$ represents the volume fraction of the solute in the wet solid region, and $\varphi_0$ represents the volume fraction of the solute in the solution filled in the micro/nanopipette. When equation (6) is substituted into equation (5), the following equation is established:

$$\frac{\pi}{4} d_{wet}^2 v_{wet} \frac{\phi_{wet} - \phi_0}{\phi_0} = \pi d_{wet} x E \quad (7)$$

Here, when the pulling speed (v) of the pipette is higher than the growth speed ($v_{wet}$) of the wet solid region, a transition region is formed between the tip of the pipette and the wet solid region to some extent, thereby forming a meniscus, and the diameter of the micro/nanowire varies depending on the stretching degree of the meniscus. On the other hand, when the pulling speed (v) of the pipette is lower than the growth speed ($v_{wet}$) of the wet solid region, the transition region may be neglectable, so that the wet solid region reaches the tip of the pipette, and thus the micro/nanowire is fabricated at the pulling speed (v), and the diameter ($d_{wet}$) of the wet solid region is the same as the inner diameter ($d_{pt}$) of the pipette tip. As a result, the critical speed ($v_c$) that determines the growth behavior of the micro/nanowire can be found from the growth rate ($v_{wet}$) of the wet solid region, and the following equation is established:

$$v_c \approx v_{wet} = \frac{4xE}{d_{pt}} \frac{\phi_0}{\phi_{wet} - \phi_0} \quad (8)$$

Equation (8) above can be simply expressed as follows from $d_{pt}$ (which is a major variable related to micro/nanowire fabrication) and the coefficient (a) which is determined by the other factors:

$$v_c = \frac{a}{d_{pt}} \left( \text{where } a = 4xE \frac{\phi_0}{\phi_{wet} - \phi_0} \right) \quad (9)$$

In Equation (9) above, $d_{pt}$ (=the inner diameter or diameter of the pipette tip) becomes an important variable that determines the critical speed ($v_c$). "a" in Equation (9) is determined by the surrounding environment, the type and concentration of material, and the like.

Here, $$a = 4xE \frac{\phi_0}{\phi_{wet} - \phi_0}$$

is only taken as an example of the most basic model, and may be modified depending on the external environmental factors (e.g., temperature, humidity, electric field, atmospheric pressure, etc.) of the micro/nanowire fabrication process.

(2) Simulation of Critical Speed

Figure 4:
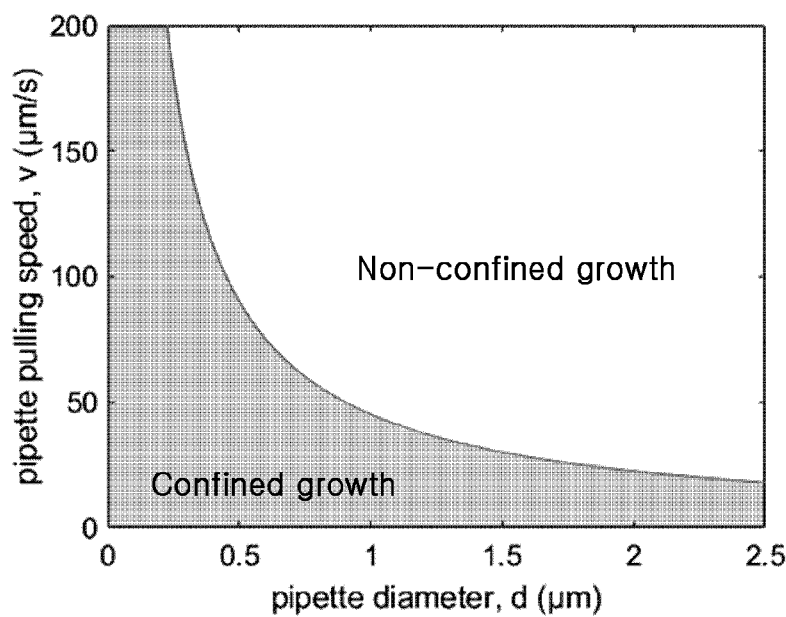
FIG. 4 is a diagram showing the relationship between the diameter of a micro/nanopipette tip and the critical speed.

FIG. 4 shows the results of simulating the growth behavior of a micro/nanowire depending on the diameter of a pipette and the pulling speed of the pipette. Referring to the simulation results, it can be seen that the critical speed ($v_c$) of the pipette is inversely proportional to the inner diameter ($d_{pt}$) of the tip of the pipette.

When the pulling speed of the pipette is higher than the critical speed ($v > v_c$), a transition region is formed as described above, and as a result, a stretched meniscus is formed and non-confined growth occurs. In the case of non-confined growth, the diameter of the stretched meniscus determines the diameter of the micro/nanowire, and hence the diameter of the stretched meniscus varies depending on the pulling speed of the pipette, so that the diameter of the micro/nanowire will continue to change depending on the pulling speed.

On the other hand, when the pulling speed of the pipette is lower than the critical speed ($v < v_c$), confined growth will occur, and a micro/nanowire having a constant diameter (which is the same as the inner diameter of the pipette tip) will grow regardless of the pulling speed of the pipette. The present disclosure relates to the growth of micro/nanowires by confined growth in which the diameter of the micro/nanowires is easily controlled.

5. EXAMPLES OF THE PRESENT DISCLOSURE

Figure 5A:
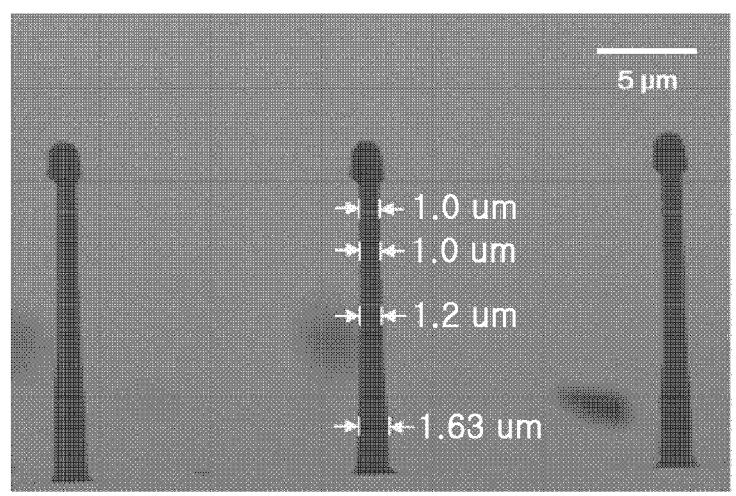
FIGS. 5a and 5b depict optical microscopic images showing the shapes of micro/nanowires formed at different pulling speeds of a micro/nanopipette.
Figure 5B:
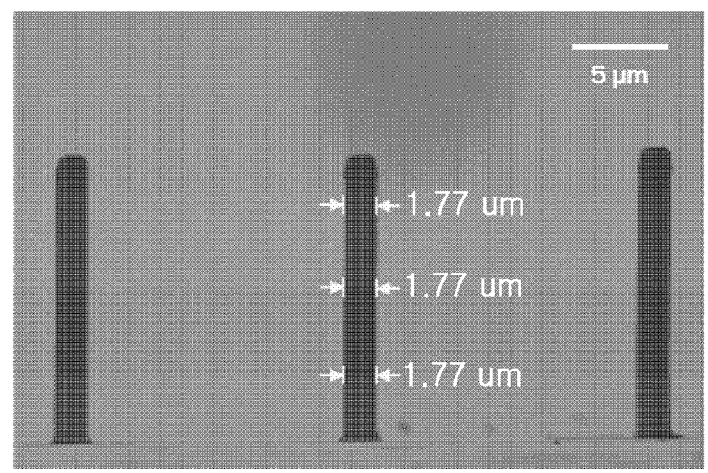

(1) Example 1. Non-Confined Growth and Confined Growth Depending on Pipette Pulling Speed FIGS. 5a and 5b show SEM images of microwires fabricated in a direction perpendicular to a substrate using a solution containing 200 µM of bovine serum albumin (BSA) protein. A pipette having a tip with an inner diameter ($d_{pt}$) of 1.77 µm was used for fabrication of each of the microwires shown in FIGS. 5a and 5b. Referring to the simulation results shown in FIG. 4, when a pipette having a tip with an inner diameter ($d_{pt}$) of 1.77 µm is used, the critical speed ($v_c$) of the pipette is 25.5 µm/s.

First, FIG. 5a shows the case in which the pipette was pulled at a higher speed than the critical speed ($v(=75$ µm/s$)>v_c$). According to the simulation, this pulling speed corresponds to the condition of non-confined growth. In fact, it can be seen that, under this condition, the diameter of the microwire gradually decreased from 1.63 µm at the beginning of growth and then converged to 1.00 µm. This is a case where the transition region of the meniscus exists, and the diameter of the microwire gradually decreased ($<d_{pt}=1.77$ µm) due to the meniscus stretching caused by pulling the pipette. This case corresponds to non-confined growth.

On the other hand, FIG. 5b shows the case in which the pipette was pulled at a lower speed than the critical speed ($v(=7.5$ µm/s$)<v_c$). According to the simulation, this pulling speed corresponds to the condition of confined growth. In fact, the microwire fabricated under this condition had a constant diameter of 1.77 µm throughout the growth thereof, and this diameter had the same value as the pipette tip diameter $d_{pt}=1.77$ µm. This suggests that, as predicted in the simulation, the microwire grew by confined growth. Under the condition of confined growth, it becomes easy to control the diameter of a micro/nanowire.

Figure 6A:
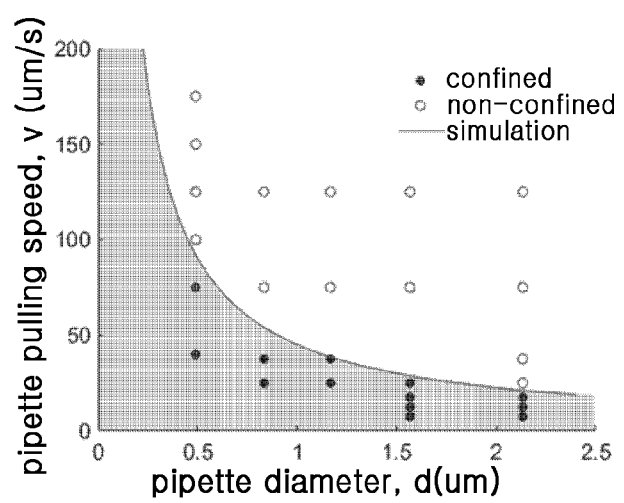
FIGS. 6a and 6b depict diagrams showing the growth behavior of BSA protein micro/nanowires depending on the pipette diameter and the pipette pulling speed.
Figure 6B:
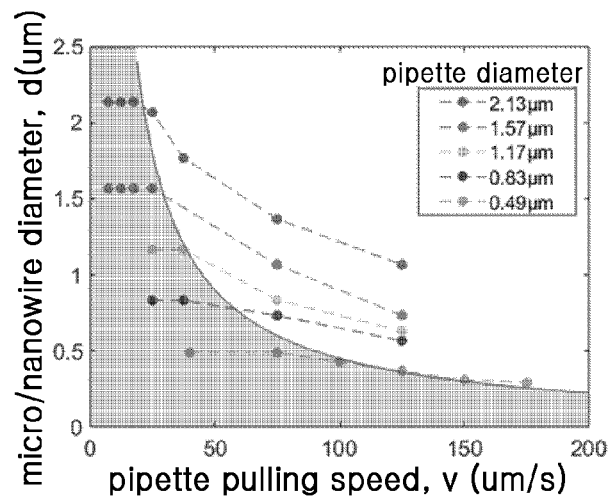

(2) Example 2. BSA Protein Micro/Nanowire Depending on Pipette Diameter and Pipette Pulling Speed FIGS. 6a and 6b show the growth behavior of a micro/nanowire depending on the diameter of a pipette and the pulling speed of the pipette in the process of fabricating the micro/nanowire using a solution containing 200 µM BSA protein. In FIGS. 6a and 6b, the inversely proportional curve indicates the critical velocity ($v_c$) determined by simulation.

FIG. 6a clearly shows that confined growth (filled dots) always occurs under the condition of $v<v_c$ for all pipette diameters, and that the BSA protein micro/nanowires always grow by non-confined growth (empty dots) under the condition of $v>v_c$. These results agree very well with the predictions obtained by simulation.

The diameter of the BSA protein micro/nanowire has a constant value equal to the diameter of the pipette tip in the confined growth region (dark background), but decreases in the non-confined growth region (bright background) as the pulling speed increases. FIG. 6b shows the diameters of micro/nanowires grown depending on the pulling speed for several pipette diameters. In fact, it can be seen that, as the pulling speed increases, the diameter of the micro/nanowire has a constant value ($=d_{pt}$) in the confined growth region (dark background), but gradually decreases in the non-confined growth region (bright background). Under the condition of confined growth, it becomes easy to control the diameter of the micro/nanowire.

Figure 7A:
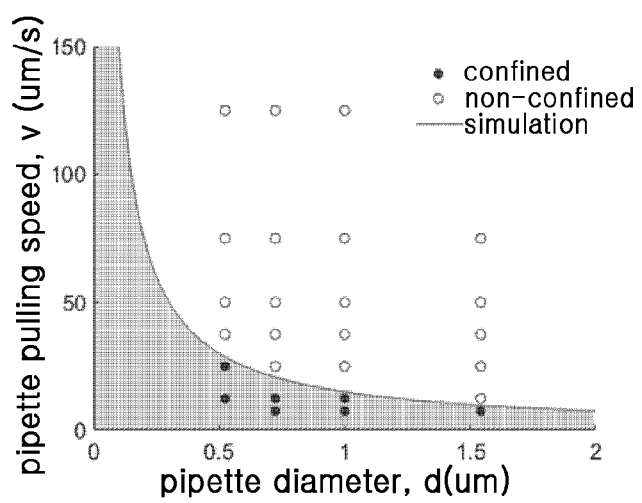
FIGS. 7a and 7b depict diagrams showing the growth behavior of DNA micro/nanowires depending on the pipette diameter and the pipette pulling speed.
Figure 7B:
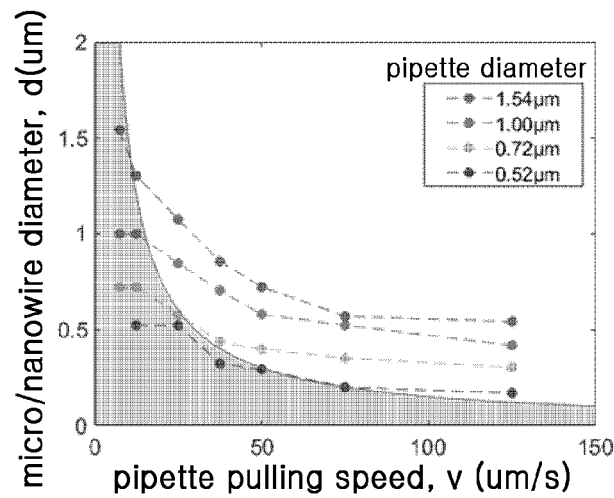

(3) Example 3. DNA Micro/Nanowire Depending on Pipette Diameter and Pipette Pulling Speed FIGS. 7a and 7b show the results of measuring the growth behavior (FIG. 7a) and diameter (FIG. 7b) of a DNA micro/nanowire depending on the diameter of a pipette and the pulling speed of the pipette in the process of fabricating the DNA micro/nanowire using a solution containing 100 µM of DNA. In FIGS. 7a and 7b, the inversely proportional curve indicates the critical velocity ($v_c$) determined by simulation. Like FIGS. 6a and 6b, FIGS. 7a and 7b clearly show that, as predicted in simulation, the DNA micro/nanowire grows by confined growth (dark background) when the pulling speed of the pipette is lower than the critical speed, and grows by non-confined growth (bright background) when the pulling speed of the pipette is higher than the critical speed.

Under the condition of confined growth, it becomes easy to control the diameter of the micro/nanowire. The following Examples all relate to the growth of micro/nanowires under the condition of confined growth.

Figure 8:
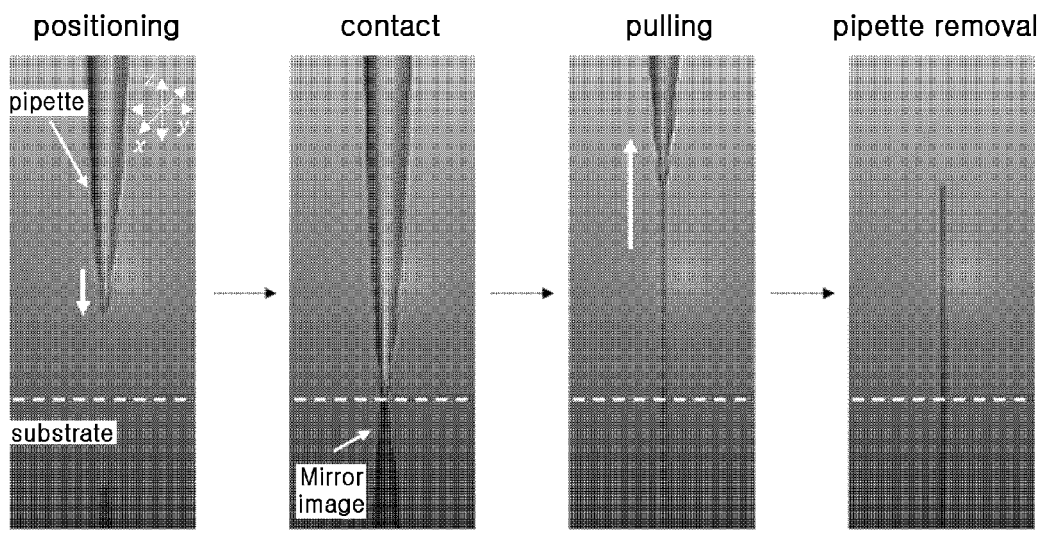
FIG. 8 depicts optical microscopic images showing a process of forming a micro/nanowire on the flat surface of an object using a micro/nanopipette.
Figure 9:
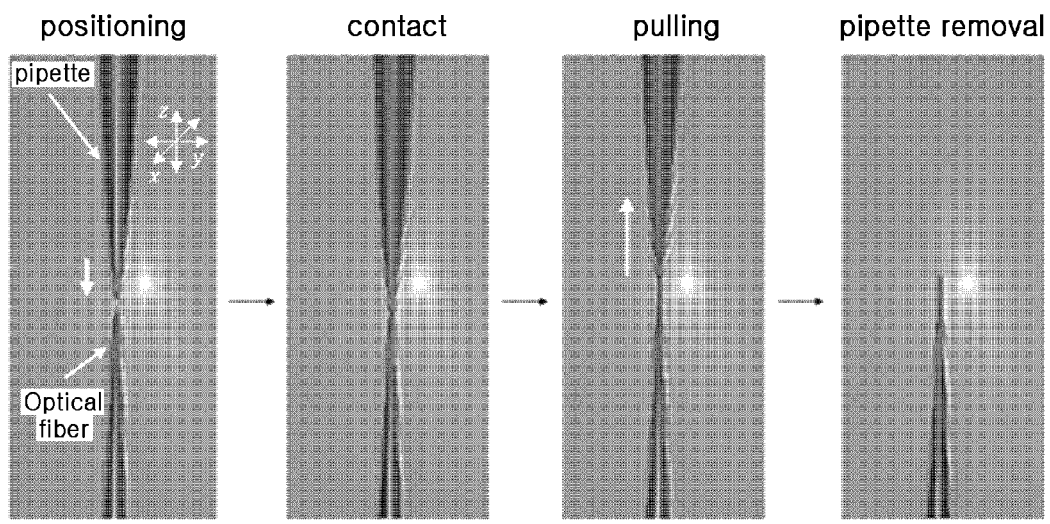
FIG. 9 depicts optical microscopic images showing a process of forming a micro/nanowire at the horn-shaped tip of an object using a micro/nanopipette.

(4) Example 4. Growth of Polymer Micro/Nanowire on Si Substrate or at Tip of Optical Fiber by Confined Growth FIGS. 8 and 9 show fabrication processes of growing polystyrene polymer micro/nanowires on a silicon (Si) substrate and at the tip of an optical fiber, respectively, in a confined growth region ($v<v_c$). The method of fabricating micro/nanowires according to this Example includes the following steps.

First, a pipette is prepared, which contains therein a solution containing a micro/nanowire-forming material and may discharge the solution through the tip thereof. At this time, the inner diameter of the pipette tip (or the outer diameter of the pipette tip; the inner and the outer diameters of the pipette tip may be considered substantially the same) may be set to substantially the same value as the diameter of the micro/nanowire to be fabricated. Subsequently, the pipette is filled with the solution containing the material, and then the pipette is moved and positioned at a desired position (positioning).

Next, the pipette tip is brought into contact with the surface of an object on which or at which the micro/nanowire is to be fabricated. For example, it can be seen that the pipette is brought into contact with the surface of a silicon substrate (FIG. 8) or the tapered tip of an optical fiber (FIG. 9) (contact).

Then, a micro/nanowire is formed by moving the tip of the pipette away from the object. At this time, the upward moving speed of the tip is preferably maintained so that the discharged material solution is not cut off or the diameter thereof does not change. When the pipette is moved upward as described above, the material-containing solution in the pipette is extended in the form of a micro/nanowire in a state connected to the target object, and a micro/nanowire having substantially the same diameter as the inner diameter (or outer diameter) of the pipette tip is formed while the solvent of the material-containing solution evaporates (pulling).

In addition, in another example, the pipette may be moved in a desired direction in order to control the shape of the micro/nanowire and the direction in which the micro/nanowire extends.

Finally, when the micro/nanowire has grown to a desired length, the produced micro/nanowire may be separated from the pipette tip by removing the pipette at a very high speed (pipette removal).

Figure 10A:
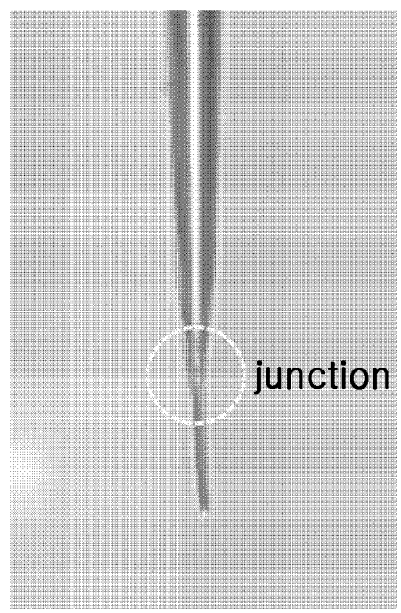
FIGS. 10a and 10b are the views showing the shape and optical coupling efficiency of a micro/nanowire formed at the tip of an optical fiber by the method of forming a micro/nanowire according to the present disclosure, respectively.
Figure 10B:
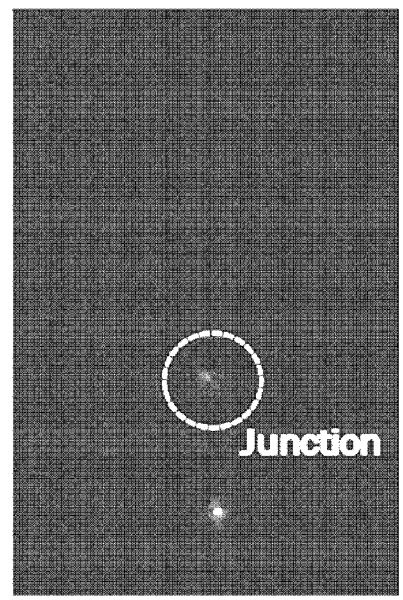

(5) Example 5. Light Transmission Through Optical Fiber to Micro/Nanofiber Grown Under Confined Growth Condition FIGS. 10a and 10b depict a bright field image (FIG. 10a) and a dark field image (FIG. 10b), which show that light emitted from a 530-nm laser light source is transmitted through an optical fiber to the tip of the polystyrene micro/nanowire grown at the optical fiber tip under the confined growth condition. In FIG. 10a, it can be seen that the optical fiber and the fine line are very smoothly connected at the junction (bright dotted circle in FIG. 10a) therebetween. In addition, it can be seen that light scattering hardly appears at the junction (bright dotted circle in FIG. 10b) between the optical fiber and the micro/nanowire. This means that the micro/nanowire formed by the micro/nanowire fabrication method according to the present disclosure has very high optical coupling efficiency.

Figure 11:
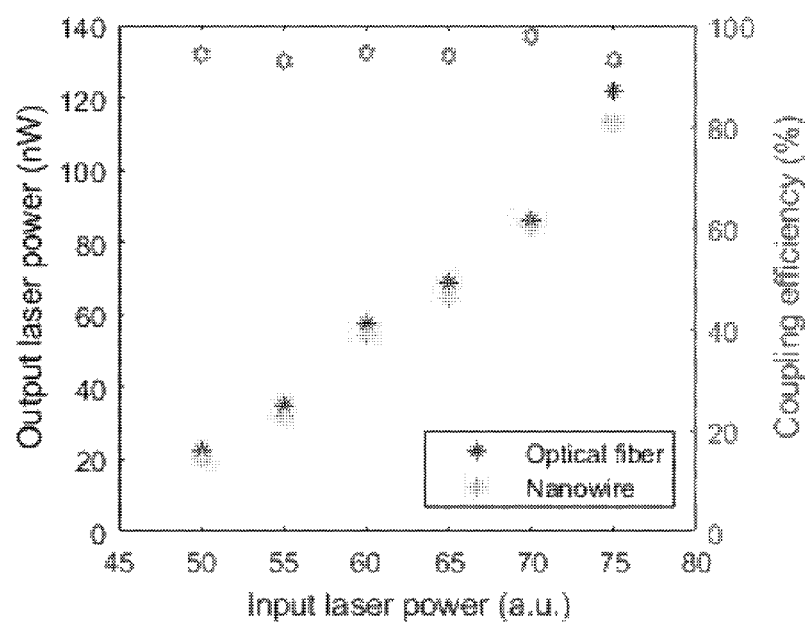
FIG. 11 is a graph showing the optical coupling efficiency of a micro/nanowire fabricated by the method of forming a micro/nanowire according to the present disclosure.

The optical coupling efficiency is defined as the ratio between the optical power at the tip of a micro/nanowire and the optical power at the tip of an optical fiber with no micro/nanowire grown, under the same condition. FIG. 11 is a graph showing the optical coupling efficiency of the polystyrene micro/nanowire fabricated under the confined growth condition according to the Example of the present disclosure. Here, the optical coupling efficiency may be calculated as the ratio of the output laser power between before and after the light is transmitted from the tip of the optical fiber to the micro/nanowire.

The dark stars in FIG. 11 indicate an optical power measured at the optical fiber tip (a tapered optical fiber tip) with no micro/nanowire grown, and the dark stars correspond to the laser power measured before the light is transmitted to the micro/nanowire.

The pale stars in FIG. 11 indicate the optical power measured at the tip of the micro/nanowire grown at the tip of the optical fiber, and correspond to the output laser power measured after the light is transmitted to the micro/nanowire.

In addition, the optical coupling efficiency calculated as the ratio of the laser power between before and after the light is transmitted to the micro/nanowire is indicated as hollow dots at the top of the graph.

It is confirmed that the optical coupling efficiency of the micro/nanowire fabricated under the confined growth condition according to the present disclosure is 92% or higher of the total power of the input laser. This high optical coupling efficiency demonstrates that the micro/nanowire fabricated under the confined growth condition is sufficient to be utilized as an optical interconnection.

The micro/nanowire fabricated on the tip of the tapered optical fiber according to the present disclosure has optical coupling efficiency of 90% or higher. Thus, the micro/nanowire thus fabricated is suitable for use as an optical interconnection for transmitting light from an optical fiber to the micro/nanowire or receiving light from the micro/nanowire to the optical fiber. In addition, the micro/nanowire may be used in an optical sensor that receives light from an optical fiber to the micro/nanowire and transmits the reflected light from the tip of the micro/nanowire or any light generated back to the optical fiber.

As described above, the method of fabricating micro/nanowires (microwires or nanowires) according to the present disclosure enables precise control of the position and geometry of the micro/nanowires within a three-dimensional space. In addition, the method omits the meniscus formation step which is essential in the conventional method, so that the process is simplified, thus greatly increasing the utility of the method. Furthermore, according to the method of the present disclosure, it is easy to control the diameter ($d_w$) of the micro/nanowire. Specifically, the diameter of the micro/nanowire may be controlled to be constant ($d_w \approx d_{pt}$) regardless of the type of material or external environmental factors, as long as the condition of confined growth is satisfied.

The above-described embodiments of the present disclosure are merely illustrative of the technical spirit of the present disclosure, and the scope of protection of the present disclosure should be interpreted by the appended claims. In addition, any person skilled in the art to which the present disclosure pertains will appreciate that various modifications and variations are possible without departing from the essential characteristics of the present disclosure. Thus, all technical ideas within the scope equivalent to the present disclosure should be construed as being included in the scope of the present disclosure.

What is claimed is:

1. A method of forming a wire at predetermined positions of an object, the wire having a nanometer-sized diameter or a micrometer-sized diameter, the method comprising:
    preparing a pipette having a tip with an inner diameter, wherein the inner diameter of the tip is a nanometer-sized inner diameter or a micrometer-sized inner diameter;
    filling the pipette with a solution containing a wire-forming material;
    bringing the solution into contact with an object through the tip of the pipette; and
    pulling the pipette apart from the object at a pulling speed lower than or equal to a predetermined critical speed ($v_c$) to obtain a wire having a nanometer-sized diameter or a micrometer-sized diameter,
    wherein the critical speed ($v_c$) is a maximum limit of the pulling speed at which the wire to be formed has a same diameter as the inner diameter of the tip of the pipette, and when the pulling speed is lower than the critical speed, the wire has substantially a same diameter as the inner diameter of the tip of the pipette, and when the pulling speed is higher than the critical speed, the wire has a diameter different from the inner diameter of the tip of the pipette.

2. The method of claim 1, wherein the critical speed ($v_c$) is inversely proportional to the inner diameter of the tip of the pipette.

3. The method of claim 1, wherein the critical speed ($v_c$) is determined by the following equation:

$$v_c = \frac{a}{d_{pt}} \left( a = 4xE \frac{\phi_0}{\phi_{wet} - \phi_0} \right)$$

wherein $d_{pt}$ is the inner diameter of the tip of the pipette; x is an axial length of a wet solid region; E is an evaporation rate of a solvent; $\varphi_{wet}$ is a volume fraction of a solute (that is, the wire-forming material) in the wet solid region; and $\varphi_0$ is a volume fraction of the solute in the solution filled in the pipette, and wherein the wet solid region shows a state in which the solvent is still evaporating from a surface of the wet solid region, even though the wet solid region retains the shape of the wire due to solidification of at least a portion of the solution drawn from the tip of the pipette.

4. The method of claim 1, further comprising separating the wire from the tip of the pipette by increasing the pulling speed of the pipette.

5. The method of claim 1, wherein the object is a silicon substrate, an optical fiber, a nanometer-sized device or structure, or a micrometer-sized device or structure, and wherein the wire is formed at a flat surface a curved surface, an edge, a corner, a vertex, or a horn-shaped tip of the object.

6. The method of claim 1, wherein the wire-forming material comprises at least one of:
 a hydrophobic polymer selected from the group consisting of polystyrene, poly(lactic acid) (PLA), poly(caprolactone) (PCA), poly(3,4-ethylenedioxythiophene) polystyrene sulfonate (PEDOT:PSS), polystyrene-co-maleic acid, poly(methyl methacrylate), polycarbonate, polyurethane, polyvinylpyrrolidone (PVP), and polyvinylidene fluoride (PVDF);
 a hydrophilic polymer selected from the group consisting of poly(acrylic acid) (PAA), polyacrylamide (PAM), polystyrene sulfonate (PSS), poly(vinyl alcohol) (PVA), alginate, and dextran;
 an organic conductive polymer ($\pi$-conjugated polymer);
 a nucleic acid selected from the group consisting of DNA and RNA;
 a protein selected from the group consisting of bovine serum albumin (BSA), gelatin, and collagen; and
 a polysaccharide selected from the group consisting of dextran and glycogen.

7. The method of claim 1, wherein a solvent for dissolving the wire-forming material comprises: at least one of DI water, dimethyl sulfoxide (DMSO), dimethylformamide (DMF), toluene, xylene, tetrahydrofuran (THF), ethanol, and chloroform; and a material capable of dissolving the wire-forming material.

* * * * *